J. B. QUIGLEY & W. GRAYSON.
Water-Cooler.
No. 213,836.  Patented April 1, 1879.
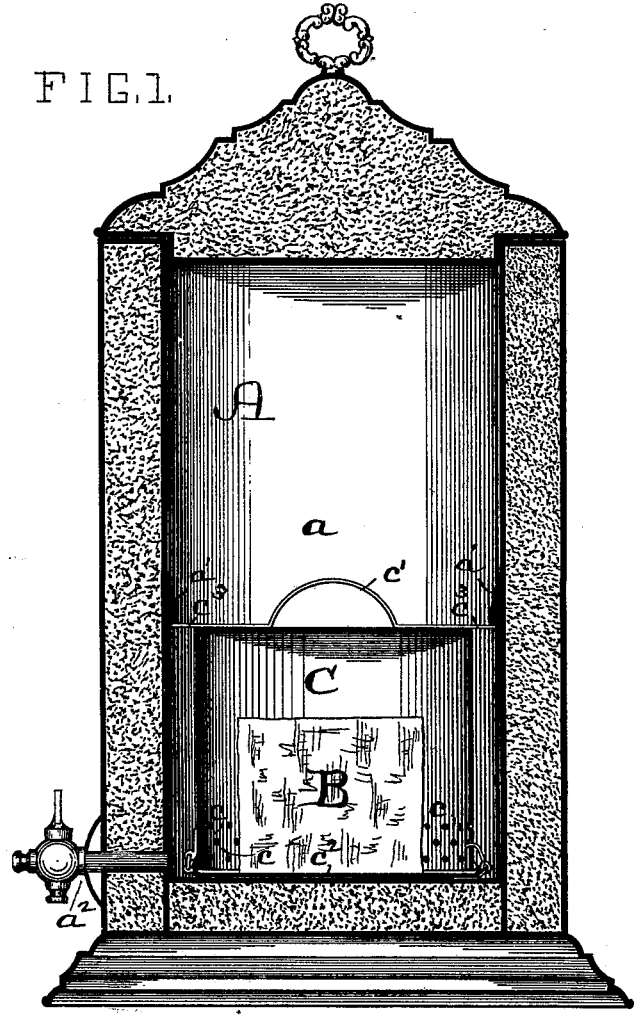
FIG. 1.
FIG. 2.
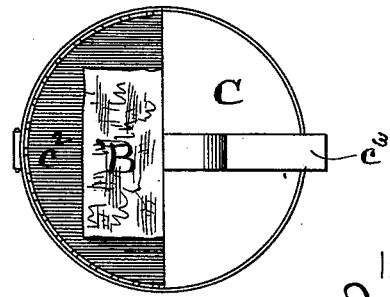
ATTEST,
Saml. S. Boyd
Paul Bakewell
INVENTORS,
John B. Quigley,
William Grayson,
by Chas. D. Moody,
att'y.

UNITED STATES PATENT OFFICE.

JOHN B. QUIGLEY AND WILLIAM GRAYSON, OF ST. LOUIS, MISSOURI, ASSIGN-ORS TO THE ST. LOUIS REFRIGERATOR AND WOODEN GUTTER COMPANY, OF SAME PLACE.

IMPROVEMENT IN WATER-COOLERS.

Specification forming part of Letters Patent No. 213,836, dated April 1, 1879; application filed September 30, 1878.

*To all whom it may concern:*

Be it known that we, JOHN B. QUIGLEY and WILLIAM GRAYSON, residents of St. Louis, Missouri, have made a new and useful Improvement in Water-Coolers, of which the following is a full, clear, and exact description, reference being had to the annexed drawings, making part of this specification, in which—

Figure 1 is a vertical section taken through a cooler having the improvement; and Fig. 2, a plan of the ice-case, part of its top being removed.

The same letters denote the same parts.

Our invention relates to an improved mode and means for cooling water and other fluids, by means whereof the consumption of the ice used in the cooling is, in proportion to the amount of water or fluid cooled, much less than by the mode hitherto in use. It is adaptable to cooling bodies of fluids of any magnitude in vessels of any size, from the small "water-cooler," so called, to large tanks or reservoirs wherein large quantities of water are cooled, as in breweries.

Heretofore it has been customary in cooling water by means of ice to allow the ice to float freely in the water. As the ice is lighter than the water, it rises into the upper stratum of the water. The effect is to cool the upper stratum to a much lower degree than the lower stratum of the water, or that stratum from which the water is drawn off for use. Even in a small portable water-cooler we have ascertained the temperature of the water in the upper part of the cooler to be from 5° to 10° lower than at the bottom of the cooler. Further, from the ice being entirely enveloped in the water, it is consumed very rapidly. Attempts have been made to obviate these difficulties by forming an ice-chamber at or near the bottom of the water-chamber, wherein the ice is entirely inclosed from the water, and relying upon the conduction of the cold through the wall of the ice-chamber. The ice is consumed very slowly when thus inclosed, but the water is not readily cooled down to the desired temperature.

To diminish the consumption of the ice and to promptly and thoroughly cool the water at the level of the discharging-orifice is our present aim.

Our improved mode consists, mainly, in confining the ice used for cooling to the lowest stratum of the water, or to that stratum which is at the level of the orifice where the water is discharged; but, instead of simply confining the ice at such lower level and preventing entirely its contact with the water by means of a tight ice-chamber, the ice, in the present construction, is held down at the bottom of the water-chamber, but by such means as to bring the water in contact with the lowest part only of the ice.

A represents an ordinary water-cooler, saving as modified by the present invention. B represents a piece of ice confined in the lowest part of the water-chamber $a$ of the cooler. C represents an imperforate case, saving openings $c\ c\ c$ at or near the bottom or lower end of the case.

The operation is as follows: The case, by means of the handle $c^1$, is withdrawn from the cooler, inverted, its bottom $c^2$ opened, and the ice placed therein. The bottom $c^2$ is then closed and fastened, so as to retain the ice, and then the case is placed upon the bottom of chamber $a$, as shown. The water passes through the openings $c\ c\ c$, coming in contact with the ice and cooled thereby.

The water does not rise in the case C much above the openings $c\ c\ c$, because of the air which is confined in the case. The water, therefore, can come in contact with the ice only at the lower part thereof, while the upper portion of the ice is surrounded by the air within the case. This air serves as a non-conductor of heat, and in consequence the ice melts more slowly than when enveloped in the water.

The case is kept from rising in the chamber $a$ by means of the arms $c^3\ c^3$, with which the case is furnished, and which are, as the case is inserted in the cooler, made to come under projections $a^1\ a^1$ upon the cooler. The water is drawn off at the orifice $a^2$.

The case C, in addition to keeping the ice in place at the bottom of the water-chamber in the manner described, is a convenience in handling the ice.

We claim—

1. The combination of the cooler A and the case C, the latter being at the bottom, and extending upward through the lower portion only of the water-chamber, and being imperforate, saving at its lower end, at which point it is perforated to enable the water to come in contact with the lower portion of the ice, as and for the purpose described.

2. A water-cooler having a perforated ice-chamber extending from the bottom upward through the lower portion only of the water-chamber, and provided with a roof for the purpose of confining the ice at the bottom of the water-chamber, but so that the water can come in contact with the ice.

J. B. QUIGLEY.
W. GRAYSON.

Witnesses:
CHAS. D. MOODY,
GEO. BROWN.